Feb. 26, 1924.
H. C. SALLAC
DIRECTION INDICATOR FOR AUTOMOBILES
Filed March 16, 1923
1,484,998
Fig. 1.
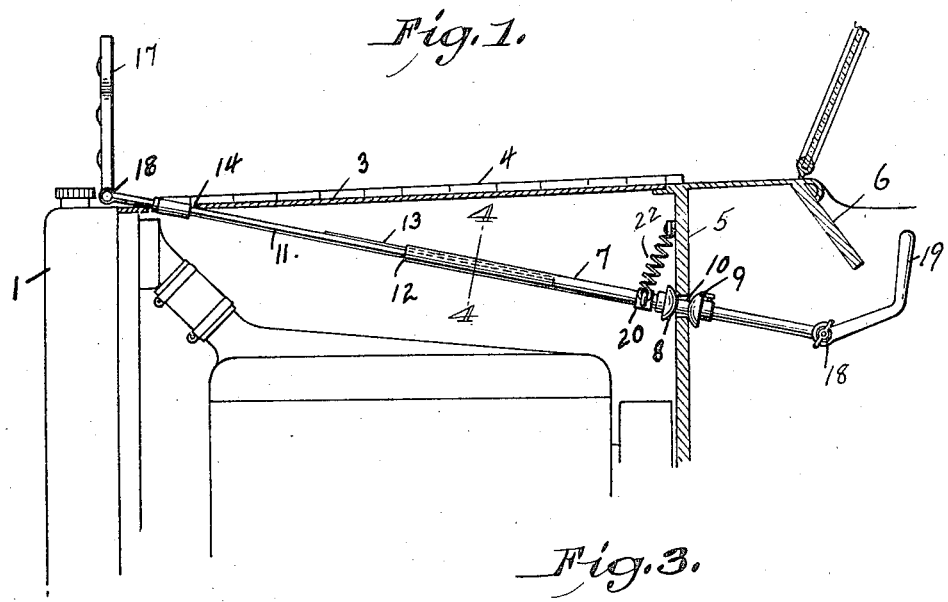
Fig. 3.
Fig. 2.
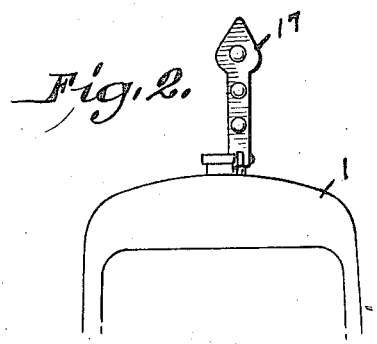
Fig. 4.
Fig. 5.
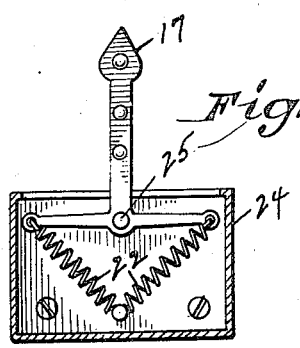
Inventor
Harry C. Sallac Patented Feb. 26, 1924.

1,484,998

UNITED STATES PATENT OFFICE.

HARRY C. SALLAC, OF ST. LOUIS, MISSOURI.

DIRECTION INDICATOR FOR AUTOMOBILES.

Application filed March 16, 1923. Serial No. 625,661.

*To all whom it may concern:*

Be it known that I, HARRY C. SALLAC, a citizen of the United States, residing at St. Louis, in the county of St. Louis and State of Missouri, have invented certain new and useful Improvements in Direction Indicators for Automobiles, of which the following is a specification.

This invention relates to improvements in direction indicators for automobiles, and has for its prime object to provide means under control of the operator of the automobile for indicating to traffic policemen at intersection of streets and also to others in front of the approaching automobile, the direction the driver of same intends to take upon reaching the corner.

A further object of my invention is to provide an illuminated indicator in the form of an arrow adapted to be positioned on top of the radiator of the motor vehicle in approximately the center of same and having means for connecting said arrow with a controller positioned beneath the dash-board of the motor vehicle within easy reach of the operator for moving the illuminated indicator either to the right or left according to the direction the driver of the vehicle intends to follow.

A still further object of my invention is to provide a direction indicator for motor vehicles of the above indicated character, which will automatically cause the illuminated indicating arrow to return to a vertical position or inoperative position as soon as the driver of the motor vehicle releases the control lever positioned beneath the dash-board of the vehicle.

And a still further object of my invention is to provide an illuminated direction indicator for motor vehicles, which is adapted to be positioned directly on the dash-board of the motor vehicle when used on trucks and other heavy vehicles, so that same may be operated to move to the right or left under pressure exerted by the foot of the operator of the vehicle.

An additional object of my invention is to provide a direction indicator for automobiles of the above indicated character, which is simple in construction, durable, efficient for the purpose intended, and one that can be manufactured and installed on a motor vehicle at a relatively low cost.

These and like objects of the invention will be better understood as the description follows and as is specifically pointed out in the appended claim.

Referring to the accompanying drawing which forms a part of this specification and which clearly illustrates the construction and operation of my improved direction indicator, Figure 1 is a side elevation of a portion of a motor vehicle showing same equipped with a direction indicator constructed in accordance with my invention.

Figure 2 is a front elevation of a portion of a motor vehicle showing my direction indicator applied thereto and supported in an inoperative position.

Figure 3 is an enlarged fragmentary section through the radiator hood of the vehicle, showing means for supporting my improved direction indicator.

Figure 4 is a section taken on line 4—4 of Figure 1, and

Figure 5 is an end elevation of a modified form of indicator.

Referring to the accompanying drawing in detail, like characters will be used to designate like parts in the different views.

In the drawing, the numeral 1 indicates the radiator of an automobile, 2 the engine, 3 the hood which is hinged as usual in the center of same as at 4, 5 the partition separating the engine from the occupant carrying compartment of the vehicle, and 6 the dash-board of the vehicle.

Extending through the partition or front wall 5 of the automobile is a hollow tubular connecting rod 7, which is provided with a fixed bearing 8 on the forward end of the partition, and a movable bearing 9 is positioned on the rod 7 at the rear of the wall or partition 5. The bearings 8 and 9 are provided with an oval face for engagement with the side edges of an aperture 10 in the wall or partition 5 through which the hollow connecting rod 7 extends.

A second rod as designated by the numeral 11 enters the open end of the hollow tubular rod as at 12, and the rod 11 and the tubular rod 7 are locked in engagement with a key 13, so that any rotary movement imparted to the rod 7 will cause the rod 11 to turn therewith. The free end of the rod 11 extends through an opening 14 provided in the top of the engine cover 3 and is secured in an inclined position as indicated in Figures 1 and 3 by means of a clamp 15 that is in turn supported on the hinged rod 16 of the engine hood 3.

An indicator 17, which is preferably in the form of an arrow and provided with a series of electric bulbs therein, which can be illuminated in any suitable manner, is mounted on the end of the rod 11 as at 18.

The inner end of the hollow tubular rod 7 is connected with a handle 19 as at 18, said handle 19 being positioned adjacent the under side of the dash-board of the motor vehicle as shown.

When the driver of a motor vehicle equipped with a direction indicator constructed in accordance with my invention wishes to indicate to a traffic policeman or others upon the approach of intersecting streets, he has only to move the handle 19 to the right or left according to the direction he intends to follow, which will move the illuminated indicator 17 to either the right or left, thus indicating to traffic policeman and others the direction the vehicle intends to go.

In order to provide means for automatically returning the indicating arrow 17 to a vertical or inoperative position, a collar 20 is affixed to the hollow tubular member 7 at a point adjacent the front of the partition 5 and the collar 20 is provided with a pair of oppositely disposed arms 21 which are connected to one end of springs 22. The opposite ends of the springs are connected at opposite ends to a bracket 23 fixed to the front of the wall or partition 5, so that as soon as pressure is released from the handle 19, the springs 22 act to return the indicator to the position shown in Figures 1 and 2.

Any suitable arrangement can be resorted to for dispensing with the electric bulbs contained in the indicator 17 when using the device in the daytime, thus saving excessive use of the battery of the motor vehicle.

In Figure 5, I have shown a slightly modified form of my invention, which is designed to be used particularly in connection with trucks or other heavy vehicles where the engine is positioned directly beneath the seat of the driver. In this instance, the indicating arrow 17 is positioned on the front of the dash-board of the motor vehicle in a casing 24. A shaft 25 extends through the casing, said shaft 25 having the indicating arrow 17 mounted thereon. The inner end of the shaft 25 can be provided with any suitable pedal so that the driver of the truck may operate the indicating arrow 17 by applying pressure of his foot thereon. In this modified form of my invention, the same is also provided with springs 22 for returning the indicating arrow 17 to its normal position.

In view of the foregoing description of my invention, taken in connection with the accompanying drawing, it is thought that any further explanation as to the construction, operation, and objects of my invention is unnecessary.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

In a direction signal for motor vehicles, a hollow telescopic rod arranged at an inclination through the engine compartment of the vehicle and terminating in juxta-position to the operator's seat thereof, a second rod keyed to the tubular rod and passing through the top of the engine hood at a point adjacent the radiator thereof, an illuminated indicator affixed to the end of the second rod and being arranged to swing in a vertical plane, a collar surrounding the tubular rod in fixed relation thereto, oppositely disposed arms extending from the collar, a bracket secured to the vehicle and springs having their ends secured to the respective arms and bracket respectively for the purpose specified.

In testimony whereof, I have affixed my signature in the presence of two witnesses.

HARRY C. SALLAC.

Witnesses:
 FELX FRANK,
 VIRGIE SALLAC.